US010889271B2

(12) United States Patent
Pink et al.

(10) Patent No.: US 10,889,271 B2
(45) Date of Patent: Jan. 12, 2021

(54) METHOD AND DEVICE FOR A MOTOR VEHICLE FOR COMPARING SURROUNDING AREA MAP DATA TO SURROUNDING AREA SENSOR DATA TO DETERMINE THE PASSABILITY OF A ROAD OBJECT

(71) Applicant: Robert Bosch GmbH, Stuttgart (DE)

(72) Inventors: Oliver Pink, Ditzingen (DE); Dominik Maucher, Stuttgart (DE); Karsten Muehlmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 16/096,937

(22) PCT Filed: Mar. 6, 2017

(86) PCT No.: PCT/EP2017/055150
§ 371 (c)(1),
(2) Date: Oct. 26, 2018

(87) PCT Pub. No.: WO2017/186385
PCT Pub. Date: Nov. 2, 2017

(65) Prior Publication Data
US 2019/0092291 A1   Mar. 28, 2019

(30) Foreign Application Priority Data
Apr. 29, 2016   (DE) .................. 10 2016 207 463

(51) Int. Cl.
*B60T 7/00*    (2006.01)
*B60T 7/22*    (2006.01)
(Continued)

(52) U.S. Cl.
CPC ............... *B60T 7/22* (2013.01); *B60W 30/08* (2013.01); *G01S 13/931* (2013.01);
(Continued)

(58) Field of Classification Search
None
See application file for complete search history.

(56) References Cited

U.S. PATENT DOCUMENTS

| 4,284,971 | A | * | 8/1981 | Lowry | G08G 1/0175 |
| | | | | | 250/222.1 |
| 4,477,184 | A | * | 10/1984 | Endo | G01S 17/931 |
| | | | | | 356/141.1 |

(Continued)

FOREIGN PATENT DOCUMENTS

| DE | 102010038970 A1 | 2/2012 |
| DE | 102013201799 A1 | 8/2014 |

(Continued)

OTHER PUBLICATIONS

International Search Report dated May 22, 2017 of the corresponding International Application PCT/EP2017/055150 filed Mar. 6, 2017.

*Primary Examiner* — Jonathan M Dager
(74) *Attorney, Agent, or Firm* — Norton Rose Fulbright US LLP; Gerard Messina

(57) ABSTRACT

A method for operating at least one vehicle relative to at least one passable object in a surrounding area of the at least one vehicle includes inputting map data values from a map, the map data values including the at least one passable object in the form of first object data values; recording surrounding area data values, which represent the surrounding area of the at least one vehicle and include the at least one passable object in the form of second object data values; reconciling the input map data values with the recorded surrounding area data values in accordance with predefined first comparison criteria; and operating the at least one vehicle as a function of the reconciliation of the data values.

10 Claims, 3 Drawing Sheets

(51) Int. Cl.
*G01S 13/931* (2020.01)
*B60W 30/08* (2012.01)
*G06F 16/909* (2019.01)
*G01S 13/89* (2006.01)
*G01S 13/87* (2006.01)
*G01S 7/41* (2006.01)

(52) U.S. Cl.
CPC ...... *G06F 16/909* (2019.01); *B60T 2201/022* (2013.01); *G01S 7/41* (2013.01); *G01S 13/87* (2013.01); *G01S 13/89* (2013.01); *G01S 2013/932* (2020.01); *G01S 2013/9316* (2020.01); *G01S 2013/9321* (2013.01); *G01S 2013/9322* (2020.01); *G01S 2013/9323* (2020.01); *G01S 2013/9324* (2020.01); *G01S 2013/93185* (2020.01)

(56) References Cited

U.S. PATENT DOCUMENTS

| | | | |
|---|---|---|---|
| 5,389,912 A * | 2/1995 | Arvin | B60Q 1/52 116/67 R |
| 5,828,320 A * | 10/1998 | Buck | G08G 1/04 340/942 |
| 6,311,123 B1 * | 10/2001 | Nakamura | B60W 30/16 701/96 |
| 6,377,205 B1 * | 4/2002 | Eckersten | G01S 13/931 342/90 |
| 6,438,491 B1 * | 8/2002 | Farmer | G08G 1/164 701/301 |
| 7,605,746 B2 * | 10/2009 | Matsuura | G01S 7/4972 342/70 |
| 7,877,209 B2 * | 1/2011 | Harris | G08G 1/165 701/301 |
| 8,199,046 B2 * | 6/2012 | Nanami | G01S 13/867 342/52 |
| 8,207,836 B2 * | 6/2012 | Nugent | G08G 1/165 340/435 |
| 8,289,141 B2 * | 10/2012 | Haberland | G01S 13/931 340/435 |
| 8,354,920 B2 * | 1/2013 | Kole | G01S 17/46 340/435 |
| 8,731,816 B2 * | 5/2014 | Dintzer | G01S 13/52 701/301 |
| 8,810,382 B1 * | 8/2014 | Laurita | G01S 13/931 340/435 |
| 8,935,086 B2 * | 1/2015 | Sadekar | G08G 1/096716 701/301 |
| 9,121,934 B2 * | 9/2015 | Ohkado | G01S 13/345 |
| 9,297,892 B2 * | 3/2016 | Smith | G01S 13/04 |
| 9,472,103 B1 * | 10/2016 | Baskaran | G08G 1/162 |
| 9,477,894 B1 * | 10/2016 | Reed | G06K 9/00791 |
| 9,495,603 B2 * | 11/2016 | Hegemann | G01S 17/894 |
| 9,546,876 B2 * | 1/2017 | Kleve | G08G 1/165 |
| 9,575,170 B2 * | 2/2017 | Kurono | G01S 13/42 |
| 9,618,607 B2 * | 4/2017 | Asanuma | G01S 13/02 |
| 9,718,402 B2 * | 8/2017 | Smyth | G08G 1/165 |
| 9,766,336 B2 * | 9/2017 | Gupta | G01S 17/931 |
| 9,847,025 B2 * | 12/2017 | Mohtashami | G08G 1/096758 |
| 10,001,560 B2 * | 6/2018 | Ishimori | G01S 13/726 |
| 10,031,224 B2 * | 7/2018 | Aoki | G01S 13/931 |
| 10,317,910 B2 * | 6/2019 | Stein | H04N 7/183 |
| 10,460,534 B1 * | 10/2019 | Brandmaier | G07C 5/008 |
| 10,507,766 B1 * | 12/2019 | Gable | B60Q 5/006 |
| 10,585,183 B2 * | 3/2020 | Cornic | G01S 13/931 |
| 10,585,188 B2 * | 3/2020 | Millar | G01S 7/415 |
| 10,586,348 B2 * | 3/2020 | Kawano | G06T 7/60 |
| 2002/0161513 A1 * | 10/2002 | Bechtolsheim | G01C 21/3667 701/454 |
| 2003/0001771 A1 * | 1/2003 | Ono | G01S 7/411 342/70 |
| 2003/0002713 A1 * | 1/2003 | Chen | G08G 1/04 382/104 |
| 2003/0011509 A1 * | 1/2003 | Honda | G01S 13/931 342/70 |
| 2004/0189451 A1 * | 9/2004 | Zoratti | B60Q 9/008 340/435 |
| 2004/0201495 A1 * | 10/2004 | Lim | G08G 1/096758 340/905 |
| 2005/0012603 A1 * | 1/2005 | Ewerhart | B62D 15/029 340/435 |
| 2007/0103282 A1 * | 5/2007 | Caird | B60R 9/04 340/435 |
| 2008/0111733 A1 * | 5/2008 | Spyropulos | G01S 7/412 342/189 |
| 2008/0189039 A1 * | 8/2008 | Sadekar | G08G 1/096741 701/301 |
| 2009/0002222 A1 * | 1/2009 | Colburn | G01C 9/00 342/145 |
| 2009/0315693 A1 * | 12/2009 | Nugent | B60Q 9/006 340/435 |
| 2010/0057353 A1 * | 3/2010 | Friedman | G08G 1/096883 701/533 |
| 2010/0238066 A1 * | 9/2010 | Lohmeier | G01S 7/10 342/70 |
| 2011/0221628 A1 * | 9/2011 | Kamo | G01S 7/295 342/70 |
| 2012/0083964 A1 * | 4/2012 | Montemerlo | G06T 7/74 701/26 |
| 2012/0139756 A1 * | 6/2012 | Djurkovic | G08G 1/04 340/905 |
| 2013/0038484 A1 * | 2/2013 | Ohkado | G01S 13/931 342/70 |
| 2013/0099910 A1 * | 4/2013 | Merritt | G01S 17/04 340/435 |
| 2013/0103305 A1 * | 4/2013 | Becker | G01C 21/3602 701/411 |
| 2013/0107669 A1 * | 5/2013 | Nickolaou | G01S 5/0252 367/125 |
| 2013/0110346 A1 * | 5/2013 | Huber | G08G 1/165 701/33.9 |
| 2013/0222592 A1 * | 8/2013 | Gieseke | G08G 1/096708 348/148 |
| 2014/0303886 A1 * | 10/2014 | Roemersperger | G01C 21/3697 701/411 |
| 2015/0066349 A1 * | 3/2015 | Chan | G01C 21/26 701/400 |
| 2015/0120178 A1 * | 4/2015 | Kleve | B60G 17/0165 701/408 |
| 2016/0028824 A1 * | 1/2016 | Stenneth | G08G 1/0112 709/219 |
| 2017/0054948 A1 * | 2/2017 | Angel | G06K 9/00791 |
| 2017/0113664 A1 * | 4/2017 | Nix | B60T 8/17558 |

FOREIGN PATENT DOCUMENTS

| | | |
|---|---|---|
| DE | 102013216951 A1 | 2/2015 |
| DE | 102013019803 A1 | 5/2015 |
| DE | 10 2014 210259 A1 | 12/2015 |
| DE | 102014216008 A1 | 2/2016 |
| EP | 1736797 A1 | 12/2006 |
| EP | 2149799 A2 | 2/2010 |
| JP | 2006119090 A | 5/2006 |
| WO | 2015/126491 A1 | 8/2015 |
| WO | 2016/192934 A1 | 12/2016 |

* cited by examiner

METHOD AND DEVICE FOR A MOTOR VEHICLE FOR COMPARING SURROUNDING AREA MAP DATA TO SURROUNDING AREA SENSOR DATA TO DETERMINE THE PASSABILITY OF A ROAD OBJECT

CROSS-REFERENCE TO RELATED APPLICATIONS

The present application is the national stage of International Pat. App. No. PCT/EP2017/055150 filed Mar. 6, 2017, and claims priority under 35 U.S.C. § 119 to DE 10 2016 207 463.6, filed in the Federal Republic of Germany on Apr. 29, 2016, the content of each of which are incorporated herein by reference in their entireties.

BACKGROUND

German Patent Application DE 10 2013 216 951 A1 describes a radar sensor for motor vehicles, including an antenna array having at least two groups of antenna elements that differ in elevation in the effective direction thereof, a control device designed for alternately activating the groups, and an evaluation device for evaluating the radar echoes received by the antenna array and for localizing objects by angular resolution, the evaluation device being designed to estimate the elevation angle of the objects on the basis of the radar echoes received from the various groups.

German Patent Application DE 10 2013 019 803 A1 describes a method for determining an object height from radar data acquired by a radar device mounted on a vehicle, a change over time in a distance of the object from the radar device being determined, and an echo signal received by the radar device being intensity modulated.

SUMMARY

According to an example embodiment of the present invention, a method for operating at least one vehicle relative to at least one passable object in the surrounding area of the at least one vehicle includes inputting map data values from a map, the map data values including the at least one passable object in the form of first object data values; recording surrounding area data values, which represent the surrounding area of the at least one vehicle and include the at least one passable object in the form of second object data values; reconciling the input map data values with the recorded surrounding area data values in accordance with predefined first comparison criteria; and operating the at least one vehicle as a function of the reconciliation of the data values.

A map is understood here first to be a (two-dimensional) map, as used for navigation, and/or secondly a (three-dimensional) map that includes data that enable sensor data, that were recorded by a vehicle, for example, to be reconciled with data stored in the maps. This means, for example, that the (three-dimensional) map was created by a first vehicle recording surrounding area data using sensors thereof, such as radar, ultrasonic, lidar, video, etc., and storing them in the form of a (three-dimensional) map, for example, in conjunction with GPS data. If, at this stage, such a map is stored within a second vehicle, this second vehicle can likewise record the surrounding area thereof using the sensors thereof and thereby reconcile the data stored in the (three-dimensional) map with the data it itself recorded. Thus, for example, the map can first be completed and/or updated, and the already stored map also used to recognize changes that will possibly influence the safety of the second vehicle, and to initiate appropriate measures. The maps can be (physically) separate from each other, as well as in the form of one map; the individual map data can be provided, for example, as the (two-dimensional) map for navigating, and as a first (three-dimensional) radar map, and/or as a second (three-dimensional) video map in the form of different map layers.

The at least one vehicle is to be understood as a partially, highly or fully automated, and also as a non-automated vehicle.

An object can be understood to be anything stored in the (two-dimensional and/or three-dimensional) map, such as landscape features including lakes, mountains, woods, etc., and/or buildings, bridges, parts of the traffic infrastructure, etc., as well as any objects that can be recorded by sensors of a vehicle. Inter alia, objects can also be those that temporarily influence an operation of the at least one vehicle.

An advantage of the present invention resides in that additional information that is highly relevant to a safe operation of the at least one vehicle is obtained by the reconciliation. This is not possible in a conventional use of a map or sensor data. This information can first be made available, for example, to an operator or driver of the at least one vehicle, allowing the operator or driver to recognize and suitably respond (earlier) to potential dangers to the operator or driver and or to the at least one vehicle; and, secondly, to a driver assistance function, for example, that performs the operation thereof incorrectly and/or incompletely on the basis of the map data or the sensor data alone. A further advantage is derived by obtaining information relating to ride comfort in addition to safety-critical information by recognizing in a timely manner that an object is not classified as passable, thereby allowing a bypassing thereof to be initiated in a timely fashion.

In an especially preferred example embodiment, the at least one passable object is an object, in particular a bridge or a tunnel, that can be passed underneath.

It is especially the safety aspect that is brought to bear in this case because sensors often erroneously detect areas in a tunnel or underneath a bridge. Incorrect conclusions are thereby drawn on the basis of this sensor data. This can adversely affect the safety of the at least one vehicle, as well as of the occupants. Reconciling the data by making the distinction between data already stored in a map and newly recorded data makes it possible to recognize an object underneath a bridge as an obstacle, for example. This would not be possible without the reconciliation.

The at least one vehicle is preferably operated in such a way that the height of the at least one vehicle is considered.

Here an advantage is derived that it is also possible to give special consideration to objects that must be passed underneath, especially in blind areas, such as tunnels or underneath a bridge, and thereby minimize any risks when driving underneath such an object.

In an especially preferred example embodiment, the first object data values include the at least one passable object in the form of recorded sensor data.

The reconciliation is preferably performed in accordance with the specified first comparison criteria in such a way that it is determined whether the at least one passable object is at least temporarily passable or impassable for the at least one vehicle.

The map can be hereby temporarily updated, for example with a notification or danger message being transmitted to other vehicles.

The map data values are preferably updated with regard to the at least one passable object.

In an especially preferred example embodiment, the operation is carried out in such a way that at least one driving assistance function of the at least one vehicle, in particular at least one automated driving assistance function of the at least one vehicle, is performed and/or modified in dependence upon the reconciliation of the data values.

An especially preferred example embodiment provides that an emergency braking be prepared and/or performed as a driving assistance function in response to the at least one passable object being recognized as temporarily impassible.

According to an example embodiment of the present invention, a device for operating at least one vehicle relative to at least one passable object in the surrounding area of the at least one vehicle includes first means for inputting map data values from a map, the map data values including the at least one passable object in the form of first object data values; second means for recording surrounding area data values, which represent the surrounding area of the at least one vehicle and include the at least one passable object in the form of second object data values; third means for reconciling the input map data values with the recorded surrounding area data values in accordance with predefined first comparison criteria; and fourth means for operating the at least one vehicle as a function of the reconciliation of the data values.

Exemplary embodiments of the present invention are illustrated in the drawings and are explained in greater detail in the following description.

DETAILED DESCRIPTION

Figure 1:
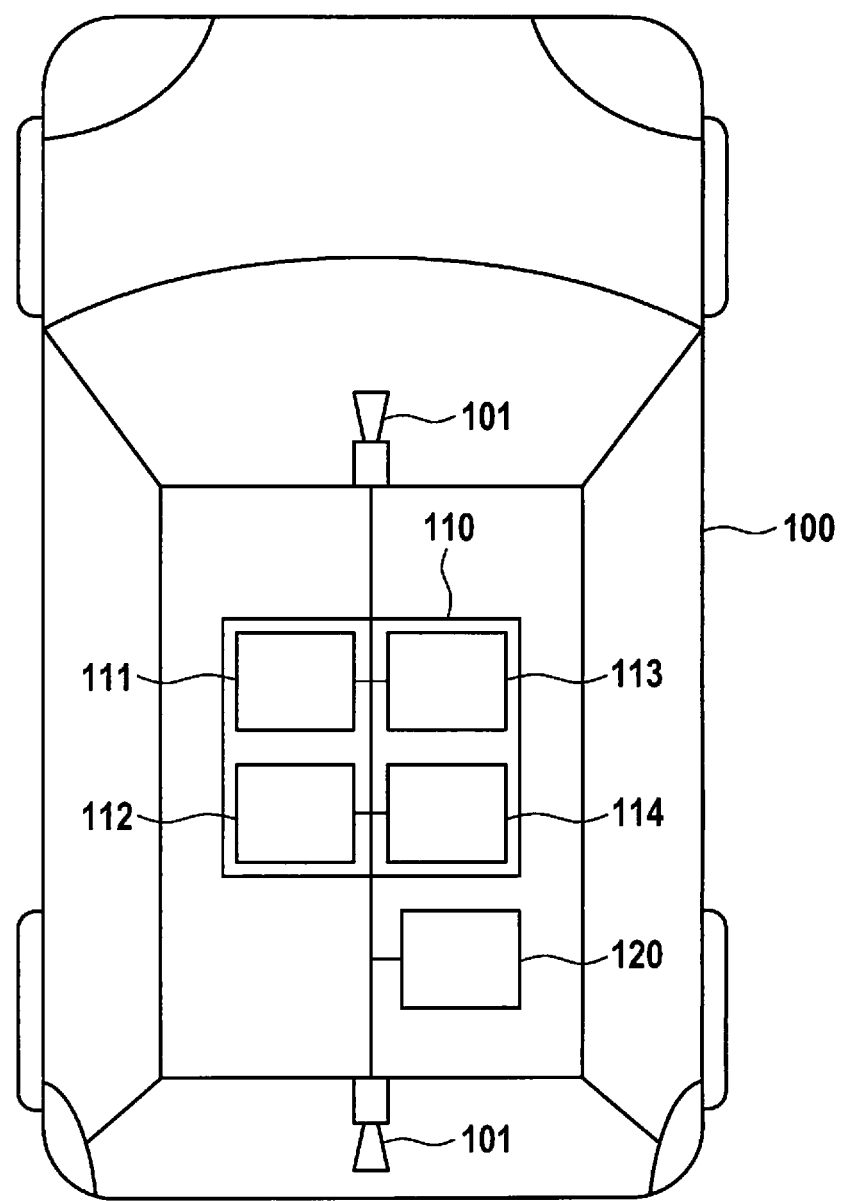
FIG. 1 shows a vehicle that incorporates a transmitting device according to an example embodiment of the present invention.

FIG. 1 shows a vehicle 100 that includes a device 110 according to an example embodiment of the present invention. The device thereby includes first means 111 for inputting 310 map data values from a map 120. The map 120 can thereby be both part of the device, as well as already stored in the vehicle 100 in a way that allows map 120 to be accessed by first means 111. The map can thereby be stored, for example, in the form of data values on a corresponding storage medium.

First means 111 are primarily designed for inputting 310 object data stored in map 120 as first object data values.

Furthermore, the device includes second means 112 for recording 320 surrounding area data values. They include sensors 101 which can be both an integral part of the device 110, as well as of the vehicle 100. The second means are thereby designed to allow access to the recorded data values of sensors 101 of vehicle 100 and use thereof for the method according to the present invention.

The sensors are video, lidar, radar, and/or ultrasonic sensors, for example. Other sensors, which are suited for capturing an object in surrounding area 250 of vehicle 100, can also be used for this purpose. Moreover, GPS and/or other position-finding sensors can be used, which can be both an integral part of device 110, as well as an integral part of vehicle 100. They can be used, for example, to determine objects more reliably and/or more rapidly on the basis of knowledge of the vehicle location by accessing two-dimensional map 120, for example, to compare the object to already stored objects and to identify the same.

The second means are primarily designed to use sensors 101 to record 320 objects in the form of second object data values.

Third means 113 make it possible to compare 330 the first object data values to second object data values. This can be accomplished, for example, by the first object data values including an object in the form of radar values that are already recorded in advance by another vehicle, for example. The second object data values thereby include the same object that is to be expected in the surrounding area 250 of vehicle 100, for example, on the basis of the location knowledge of vehicle 100, likewise in the form of radar values that were actually recorded by radar sensors 101.

At this stage, these data values are compared 330 in that differences in both data records, for example, are sought and identified as such. This is accomplished by appropriate computer programs that are likewise included in third means 113.

Following the reconciliation 330 of the first and second object data values by third means 113, the reconciliation results are transmitted to fourth means 114.

Furthermore, third means 113 are thereby designed to enable map 120 to be updated once the first and second object data values are reconciled 330 when it is determined, for example, that the second object data values are recognized as being consistently correct in comparison to the first object data values.

This can occur, for example, when sensors 101 of vehicle 100 detect a bridge that is not yet stored in map 120.

Fourth means 114 can be both an integral part of device 110, as well as an integral part of vehicle 100, for example, in the form of a control unit that is designed for performing driving assistance functions, such as emergency-braking maneuvers. The reconciliation results are thereby forwarded in a way that enables the driving assistance function to use the results to appropriately adapt and influence the maneuvers thereof to be performed.

Figure 2:
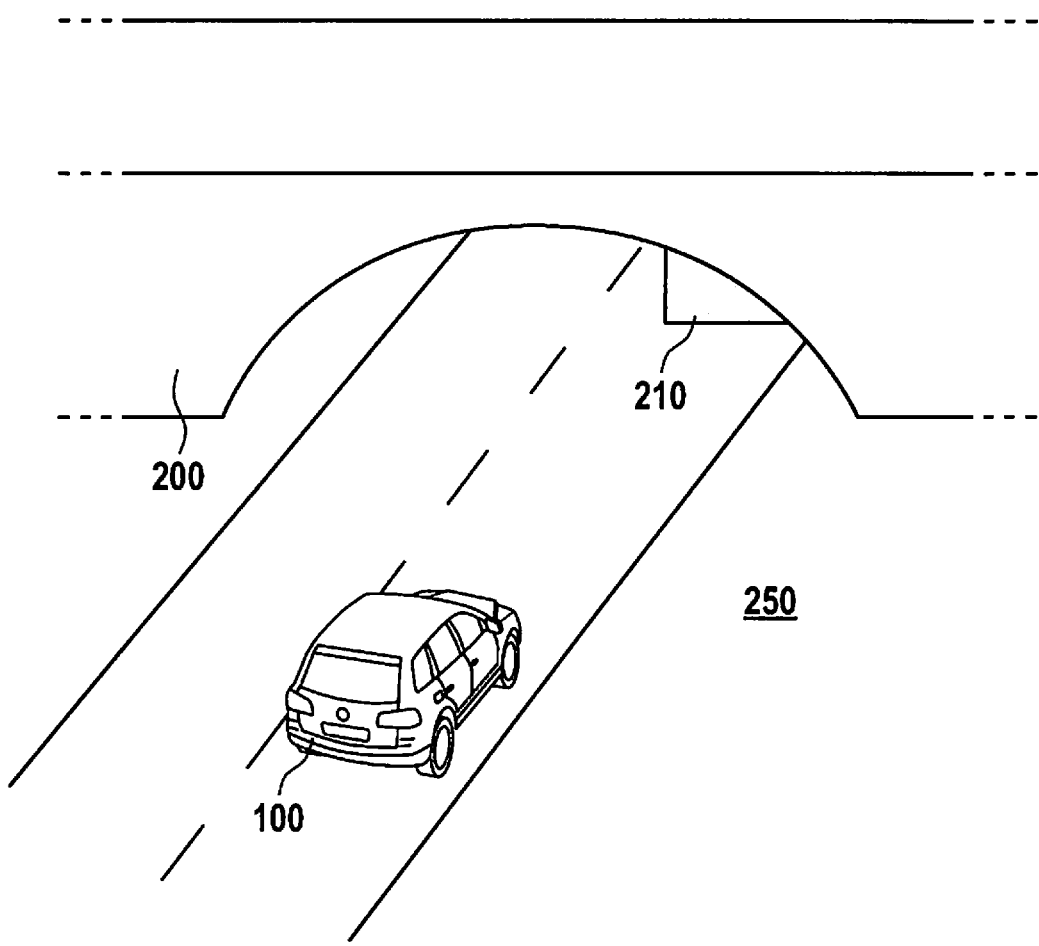
FIG. 2 shows a situation where a method is advantageously usable according to an example embodiment of the present invention.

FIG. 2 shows a situation where the method according to the present invention is advantageously used. Vehicle 100 approaches a passable object 200, here in the form of a bridge to be passed underneath. In principle, object 200 to be passed underneath can be any object whose structure can lead to a limited operation of sensors 101, which, because of the structure, are not able to fully detect surrounding area 250 of the vehicle, specifically detect it in a way that makes possible a safe and/or reliable operation of vehicle 100. In this context, it can also be a tunnel or an overhanging mountain wall, the road running underneath the overhang. In this instance, the height of vehicle 100 also plays a special role and can likewise be considered. This is done, for example, in that, following reconciliation 330, the height of vehicle 100 is additionally recorded by appropriate sensors 101, and the information about the height is transmitted as additional information to fourth means 114.

In the situation shown here exemplarily, an object 210, which prevents a safe passage of vehicle 100, is located underneath the bridge in the lane of vehicle 100. Since this object 210 is located underneath the bridge, it is hardly possible for it to be recorded by the sensors of vehicle 100, and it is recognized as a danger. At this stage, reconciling the recorded second object data values with the first input object data values makes it possible for object 210 to be recognized due to a difference in the data values, whereby the operation 340 of vehicle 100 can be adapted accordingly. In the case of a non-automated vehicle, this can be effected, for example, by already preparing certain safety systems, such as an airbag or an emergency braking system, to ensure that the systems are available as quickly as possible in the case that a driver of vehicle 100 fails to brake. In the case of an automated vehicle, the trajectory, for example, can be adapted (taking into account the existing traffic) and vehicle 100 can be controlled to drive around object 210.

Moreover, it can occur that an object 200, such as the bridge, for example, is altogether recognized as an obstacle, since, for example, the area underneath the bridge is perceived as being so dark that a video sensor recognizes the actual passage possibility as an obstacle. At this stage, reconciliation 330 of the first and second object data values can result here in operation 340 of vehicle 100 being adapted in such a way that no unnecessary emergency braking is triggered, rather vehicle 100 is able to pass underneath the bridge without any problems.

Figure 3:
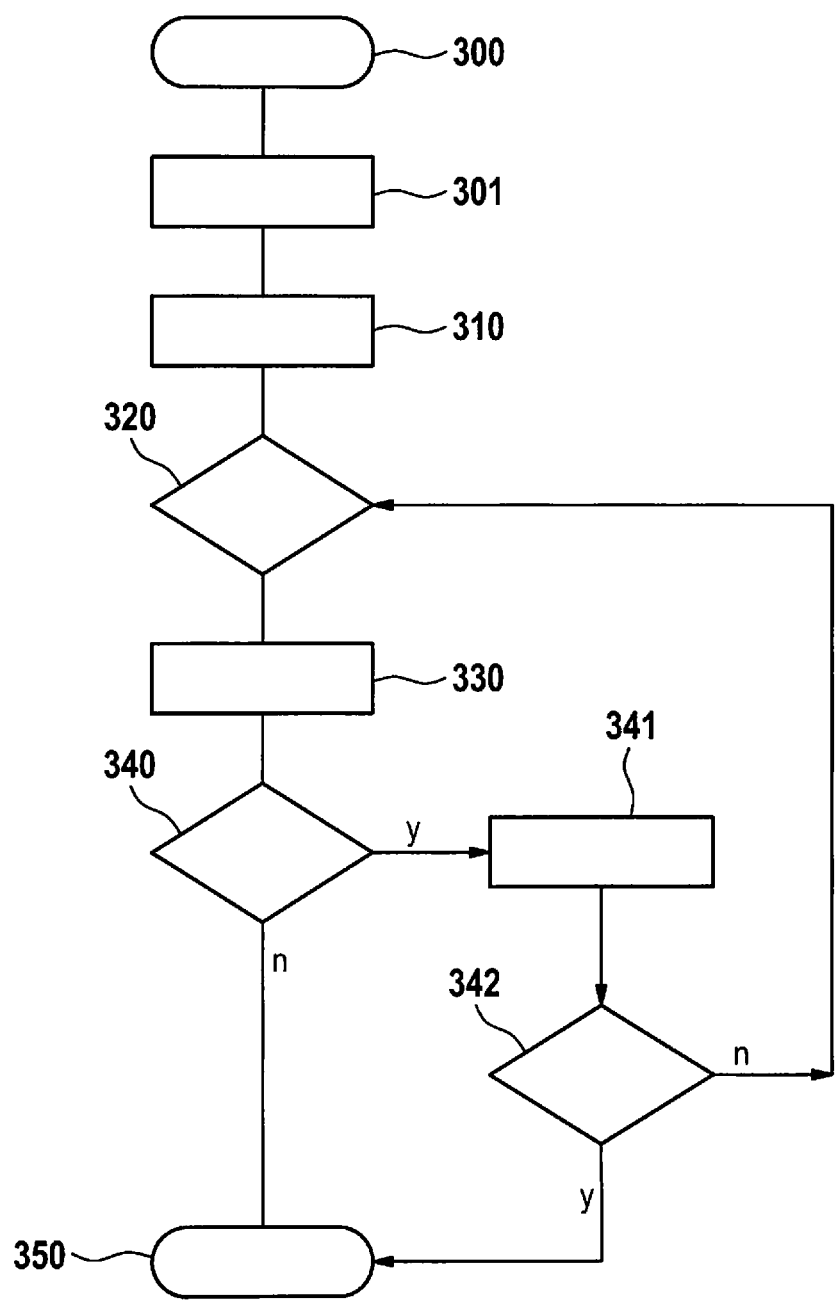
FIG. 3 is a flowchart that illustrates a method according to an example embodiment of the present invention.

On the basis of a flowchart, FIG. 3 shows an exemplary embodiment of the method according to the present invention. The method begins in step 300. In step 301, the at least one vehicle 100 approaches a passable object 200. This can be realized by a passable object in two-dimensional map 120 being recognized as such, for example, in the manner of a navigation system recognizing a bridge. It is also possible that a passable object be recognized by sensors 101 of vehicle 100 detecting such an object 200 in surrounding area 250 of vehicle 100. In addition, both methods can be used for a mutual plausibility check.

In step 310, first object data values, which include the passable object, are input from map 120. In step 320, sensors 101 record second object data values, which likewise include passable object 200. In step 330, the first object data values are compared to the second object data values.

As a function of the comparison performed in step 330, the at least one vehicle 100 is operated in step 340 in such a way that it is determined whether or not there is a danger for the at least one vehicle 100 and or for the occupants thereof upon passing passable object 200. If such a danger exists, step 341 follows; and if there is no danger, the method ends with step 350.

In step 341, safety systems, such as an airbag or an emergency braking system, for example, are prepared for a potential collision.

In step 342, the decision is made as to whether an emergency braking is to be already initiated and, if indicated, is also initiated. If an emergency braking is initiated, step 350 follows, and the method ends. If the decision is made that there is no need to initiate an emergency braking, step 320 follows since sensors 101 can be able to better detect passable object 200 in response to the at least one vehicle 100 approaching passable object 200 and thus evaluate the situation more efficiently or accurately on the basis of reconciliation 330.

The method ends in step 350.

What is claimed is:

1. A method for operating a vehicle relative to a passable object in a surrounding area of the vehicle, the method comprising:

inputting map data values from a map, the map data values including first object data values representing the passable object;

recording, via sensors on the vehicle, second object data values representing the surrounding area, including the passable object;

reconciling the input map data values with the second object data values in accordance with predefined first comparison criteria; and operating the vehicle as a function of the reconciliation;

wherein in the reconciling, to compare the first object data values to the second object data values, the first object data values include an object in the form of radar values that are already recorded in advance by another vehicle, and wherein the operation of the vehicle is performed based on a height of the vehicle in view of the reconciliation, and wherein the height of the vehicle is obtained by at least one of the sensors on the vehicle.

2. The method of claim 1, wherein the passable object is an object underneath which the vehicle can pass.

3. The method of claim 1, wherein the object is a bridge or a tunnel.

4. The method of claim 1, wherein the first object data values representing the passable object are recorded sensor data.

5. The method of claim 1, wherein the reconciliation includes determining whether the passable object is at least temporarily passable or impassable for the vehicle.

6. The method of claim 5, wherein the operating includes controlling or executing an emergency braking as a driving assistance function in response to a recognition that the passable object is temporarily impassible.

7. The method of claim 1, wherein the map data values are updated with regard to the passable object.

8. The method of claim 1, wherein the operating includes controlling or executing a driving assistance function of the vehicle based on the reconciliation.

9. The method of claim 8, wherein the operating includes controlling or executing an emergency braking as the driving assistance function in response to a recognition, in the reconciliation, that the passable object is temporarily impassible.

10. A device for operating a vehicle relative to a passable object in a surrounding area of the vehicle, comprising:

sensors, wherein the sensors are configured to record first object data values representing the surrounding area, including the passable object; and a processor configured to perform the following:
  obtaining map data values of a map, the map data values including second object data values representing the passable object;
  reconciling the input map data values with the first object data values in accordance with predefined first comparison criteria; and controlling an operation of the vehicle as a function of the reconciliation;

wherein in the reconciling, to compare the first object data values to the second object data values, the first object data values include an object in the form of radar values that are already recorded in advance by another vehicle, and wherein the operation of the vehicle is performed based on a height of the vehicle in view of the reconciliation, and wherein the height of the vehicle is obtained by at least one of the sensors on the vehicle.

\* \* \* \* \*